(12) United States Patent
Watanabe (10) Patent No.: US 8,427,544 B2
(45) Date of Patent: Apr. 23, 2013

(54) CONTROL APPARATUS, CONTROL SYSTEM, COMMAND TRANSMISSION METHOD, AND NON-TRANSITORY COMPUTER-READABLE STORAGE MEDIUM

(75) Inventor: Hajime Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 277 days.

(21) Appl. No.: 12/860,426

(22) Filed: Aug. 20, 2010

(65) Prior Publication Data
US 2011/0050925 A1  Mar. 3, 2011

(30) Foreign Application Priority Data

Aug. 28, 2009  (JP) .................................. 2009-199019

(51) Int. Cl.
*H04N 5/232*  (2006.01)
(52) U.S. Cl.
USPC ............... 348/211.11; 348/211.2; 348/211.3
(58) Field of Classification Search ............. 348/211.11, 348/211.3, 211.14
See application file for complete search history.

(56) References Cited

U.S. PATENT DOCUMENTS

| | | | |
|---|---|---|---|
| 6,856,346 B1 * | 2/2005 | Kobayashi et al. | 348/211.99 |
| 6,909,457 B1 * | 6/2005 | Fukasawa | 348/211.11 |
| 7,298,964 B2 * | 11/2007 | Ishikawa et al. | 386/223 |
| 7,511,737 B2 * | 3/2009 | Singh | 348/211.3 |
| 7,889,238 B2 * | 2/2011 | Kurosawa | 348/211.11 |
| 8,115,814 B2 * | 2/2012 | Iwase et al. | 348/169 |
| 2006/0263066 A1 * | 11/2006 | Matsumoto | 386/107 |
| 2008/0045159 A1 * | 2/2008 | Mashimo et al. | 455/68 |
| 2011/0216208 A1 * | 9/2011 | Matsuzawa et al. | 348/211.2 |

FOREIGN PATENT DOCUMENTS

JP       2005-252568      9/2005

* cited by examiner

*Primary Examiner* — Tuan Ho
*Assistant Examiner* — Shahbaz Nazrul
(74) *Attorney, Agent, or Firm* — Cowan, Liebowitz & Latman, P.C.

(57) ABSTRACT

A control apparatus that is connected to at least one image capturing apparatus by wireless communication transmits, by multicast or broadcast via the wireless communication, a command for instructing to start a prescribed operation to each image capturing apparatus, in response to detection of an operation for instructing to start the prescribed operation, and transmits, by unicast via the wireless communication, a command for instructing to end the prescribed operation to each image capturing apparatus, in response to detection of the operation for instructing to end the prescribed operation. Then, the control apparatus confirms a response to transmission of the command for instructing to end the prescribed operation, and retransmits, by unicast, the command to end the prescribed operation to each image capturing apparatus whose response is not confirmed.

20 Claims, 11 Drawing Sheets

CONTROL APPARATUS, CONTROL SYSTEM, COMMAND TRANSMISSION METHOD, AND NON-TRANSITORY COMPUTER-READABLE STORAGE MEDIUM

BACKGROUND OF THE INVENTION

1. Field of the Invention

The present invention relates to a control apparatus for controlling at least one image capturing apparatus connected via a communication means and a control system.

2. Description of the Related Art

Generally, there are camera systems configured to enable cameras that are placed respectively under different shooting conditions and at different angles with respect to an object to perform a collaborative operation using a communication cable, a wireless communication apparatus, or the like. For example, Japanese Patent Laid-Open No. 2005-252568 discloses a camera system for enabling shooting of an object by operating a plurality of image capturing apparatus using one control apparatus via wireless communication, and displaying the shot image data with the control apparatus.

However, although a system using wireless communication is easy to handle compared to a system using wired communication since it does not need to be connected via a communication cable, such a system is easily affected by disturbances and the like, and thus is inferior in terms of communication reliability. In Japanese Patent Laid-Open No. 2005-252568 described above, although a technique with regard to cooperative shooting to operate a plurality of image capturing apparatus using one control apparatus is disclosed, there is no description of maintaining communication reliability against disturbances and the like. In order to solve the problem with regard to communication reliability, although a method for achieving reliability by performing communication retransmission processing and the like is conceivable, since the time period necessary for wireless communication becomes longer, it has been difficult to secure both a response and communication reliability.

SUMMARY OF THE INVENTION

According to one embodiment of the present invention, it is possible to secure a response and communication reliability in a system for controlling at least one image capturing apparatus using a control apparatus.

According to one aspect of the present invention, there is provided a control apparatus configured to be connected to at least one image capturing apparatus by wireless communication, the control apparatus comprising: a detection unit configured to detect an operation that is made by a user; a transmission unit configured to transmit, by multicast or broadcast via the wireless communication, a command for instructing to start a prescribed operation to each image capturing apparatus that is connected to the control apparatus, in response to the detection unit detecting an operation for instructing to start the prescribed operation, and to transmit, by unicast via the wireless communication, a command for instructing to end the prescribed operation to each image capturing apparatus, in response to the detection unit detecting an operation for instructing to end the prescribed operation; and a control unit configured to confirm a response from each image capturing apparatus to transmission of the command for instructing to end the prescribed operation, and to cause the transmission unit to retransmit, by unicast, a command for instructing to end the prescribed operation to each image capturing apparatus whose response is not confirmed.

According to another aspect of the present invention, there is provided a control apparatus configured to be connected to at least one image capturing apparatus by wireless communication, the control apparatus comprising: a detection unit configured to detect an operation made by a user; a transmission unit configured to transmit, by multicast or broadcast via the wireless communication, a command for instructing to start a prescribed operation to each image capturing apparatus that is connected to the control apparatus, in response to the detection unit detecting an operation for instructing to start the prescribed operation, and to transmit, by multicast or broadcast via the wireless communication, a command for instructing to end the prescribed operation to each image capturing apparatus, in response to the detection unit detecting an operation for instructing to end the prescribed operation; and a response unit configured to transmit, in response to an inquiry about a status of the operation related to the prescribed operation that has been started in each image capturing apparatus in response to reception of the command for instructing to start the prescribed operation, information that indicates the status of the operation to each image capturing apparatus from which the inquiry originated.

Further features of the present invention will become apparent from the following description of exemplary embodiments with reference to the attached drawings.

DESCRIPTION OF THE EMBODIMENTS

First Embodiment

Figure 1A:
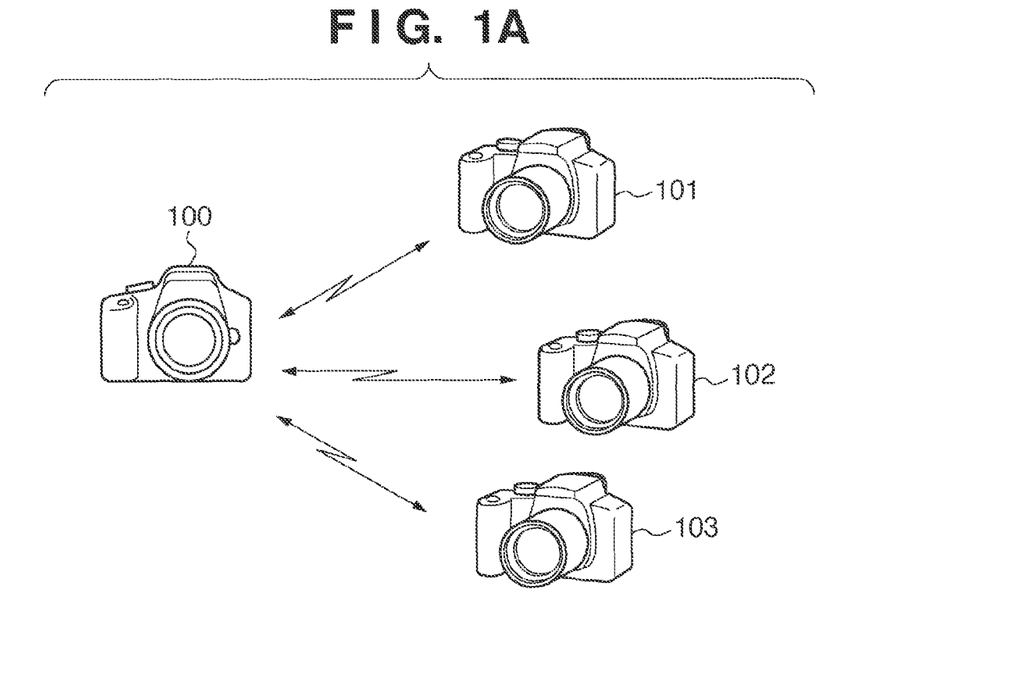
FIGS. 1A and 1B are configuration diagrams showing camera systems.
Figure 1B:
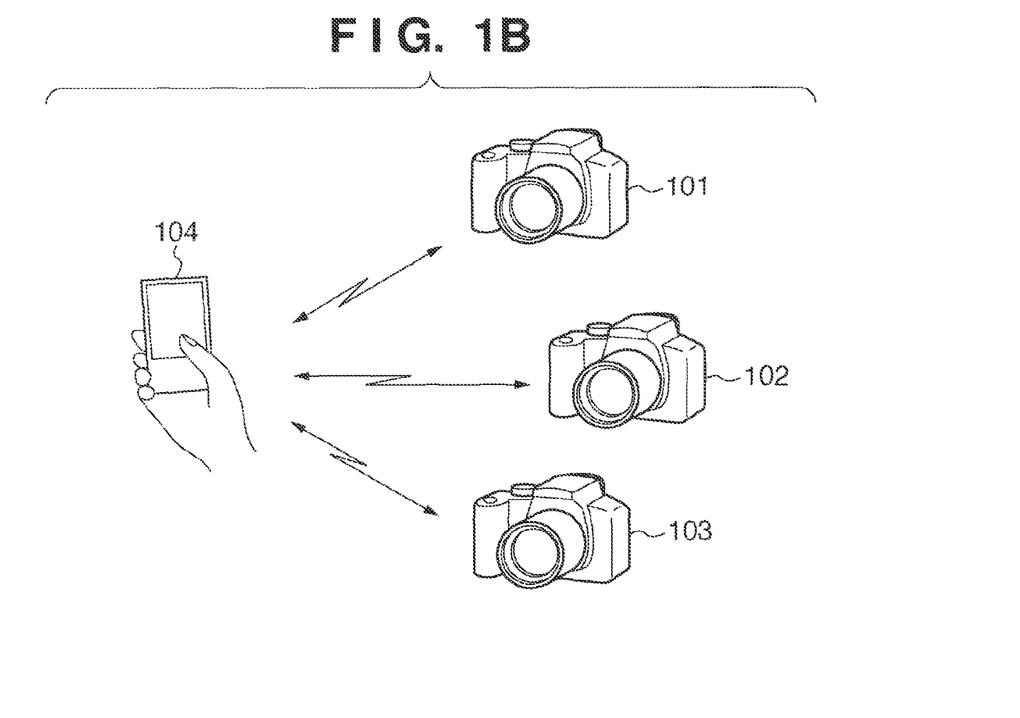

Hereinafter, preferred embodiments of the present invention will be described in detail based on the accompanying drawings. FIGS. 1A and 1B are schematic block diagrams showing the configurations of camera systems in the case where image capturing apparatus according to a first embodiment are adapted to interchangeable lens digital cameras (hereinafter, simply cameras).

FIG. 1A shows a case where a camera is applied as a control apparatus, and a case where a plurality of cameras (four cameras in FIG. 1A) having a built-in wireless communication apparatus are connected via wireless communication in a camera system in the present embodiment. Note that although it is assumed to use a wireless LAN in compliance with the IEEE 802.11 standard as the mechanism for wireless communication, it is also possible to use another wireless system as long as wireless communication is possible between a plurality of cameras.

It is assumed that a camera 100 is set as a master camera that operates as a control apparatus for controlling other cameras, and cameras 101, 102, and 103 are set as slave cameras that operate as control target apparatus controlled by the control apparatus. Operating the master camera 100 causes the master camera 100 to notify the slave cameras of a control signal via wireless communication. Specifically, it is possible to control the slave cameras 101, 102, and 103 by operating the master camera 100. In the present embodiment, if a shooting operation is performed with the master camera 100, a shooting operation is also simultaneously controlled in the slave cameras 101, 102, and 103. Note that although a shooting operation is described as an example of a collaborative operation, the present invention is not limited thereto.

FIG. 1B shows a case where a remote controller 104 provided with a wireless communication apparatus is applied as a control apparatus, and a case where the remote controller 104 is connected to a plurality of cameras (three cameras in FIG. 1B) having a built-in wireless communication apparatus via wireless communication. It is possible to control the slave cameras 101 to 103 by operating the remote controller 104. Note that the case where the control apparatus is a camera (the master camera 100) as shown in FIG. 1A will be described below.

Figure 2:
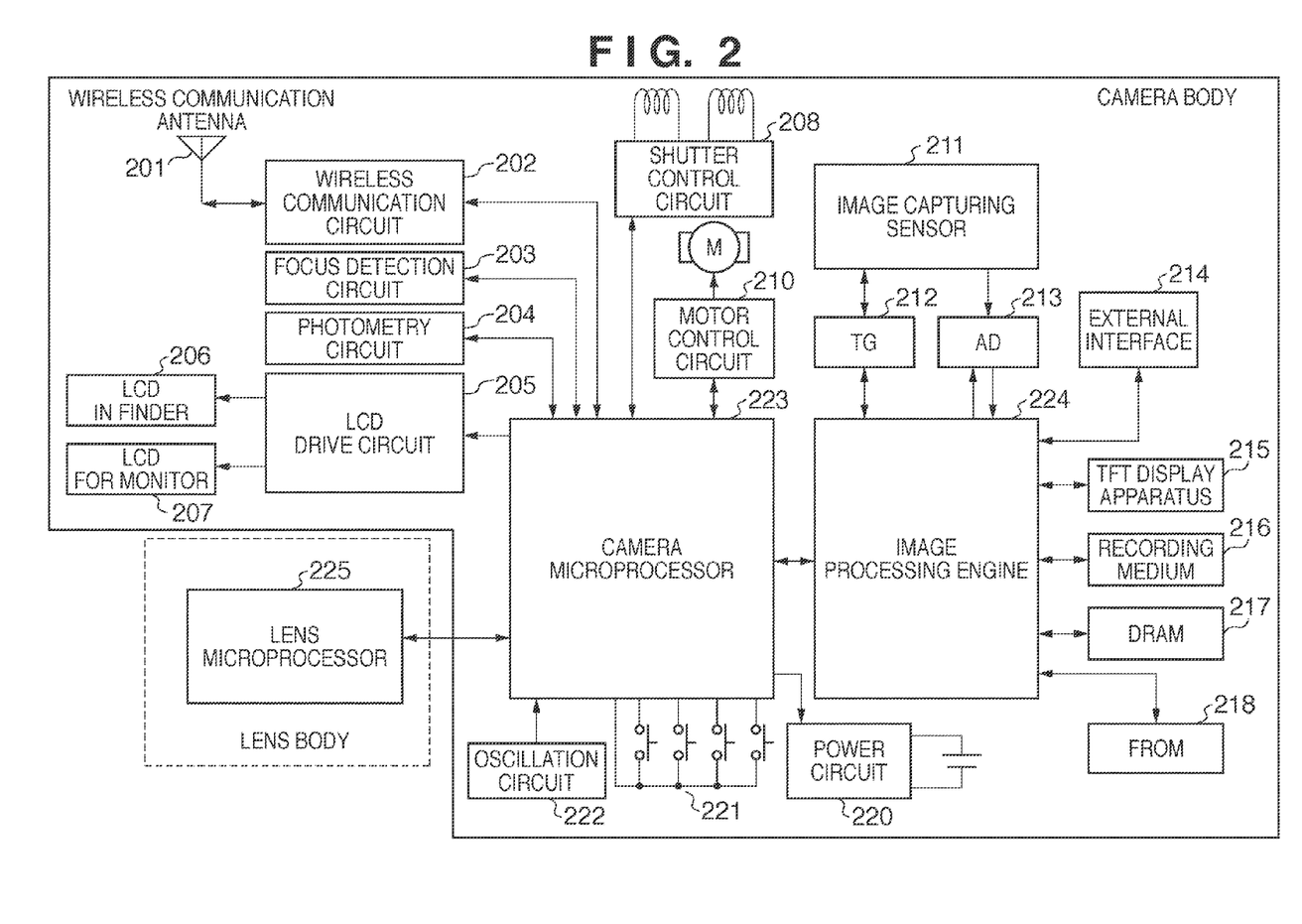
FIG. 2 is a block diagram showing the configuration of a camera body.

FIG. 2 is a schematic block diagram showing the configuration of the body of the camera 100 according to the first embodiment. A camera microprocessor 223 is a main microprocessor that controls the camera body, and performs power control, switch control, lens control, photometry, distance measurement control, shutter control, wireless communication control, and so on. A power circuit 220 and a switch array 221 including SW1 and SW2 serving as a release button and an operation member for operating a GUI (graphical user interface) described later are connected to the camera microprocessor 223. Moreover, an oscillation circuit 222, a wireless communication circuit 202, a focus detection circuit 203, a photometry circuit 204, an LCD drive circuit 205, a shutter control circuit 208, a motor control circuit 210, an image processing engine 224, and the like are connected to the camera microprocessor 223. Further, with respect to an interchangeable shooting lens, signals are transmitted to/from a lens microprocessor 225 serving as a lens control circuit disposed in the lens via a mount contact.

The focus detection circuit 203 performs storage control and reading control of a distance measuring sensor in accordance with signals from the camera microprocessor 223, outputs information on each pixel to the camera microprocessor 223, and performs focus detection using a well-known phase-difference detection method. The camera microprocessor 223 performs lens focus adjustment (AF) using focus detection information by exchanging signals with the lens microprocessor 225. The photometry circuit 204 outputs luminance signal output from a photometry sensor to the camera microprocessor 223 as a luminance signal of an object, and performs well-known exposure computation (AE) such as aperture value computation and shutter speed computation.

The shutter control circuit 208 controls two shutter drive magnets that constitute a focal-plane shutter in accordance with signals from the camera microprocessor 223, and drives a shutter screen, thereby performing an exposure operation. SW1 is a switch that is turned ON by the first stroke of the release button, and starts AE and AF. SW2 is a switch that is turned ON by the second stroke of the release button, and starts an exposure operation. The camera microprocessor 223 detects signals from SW1, SW2, and other camera operation members. The LCD drive circuit 205 controls the display of an LCD 206 in a finder, and the display of an LCD 207 for a monitor in accordance with signals from the camera microprocessor 223.

The image processing engine 224 is a processor that mainly performs digital image processing, and performs storage control and reading control of an image capturing sensor 211 via a timing generator (TG) 212. Analog/digital conversion is performed on a read image signal by an AD converter 213, and known image processing, such as color complement processing, white balance processing, and gamma processing is performed on that image signal. Then, the resultant image signal is finally converted into JPEG digital image data, for instance, and temporarily saved in a DRAM 217, and also that data is displayed on a TFT display apparatus 215 for quick review, and furthermore is recorded on a recording medium 216. Further, the TFT display apparatus 215 also displays a GUI to set settings of the camera, and the GUI is configured so as to enable various settings of the camera, a wireless communication setting, master camera and slave camera settings, and a network setting using the operation member of the switch array 221.

Note that the configuration described with reference to FIG. 2 is also the same as that of the slave cameras 101, 102 and 103. The cameras exchange wireless communication packets generated by the camera microprocessor 223 via a wireless communication antenna 201 serving as a communication means and the wireless communication circuit 202, thereby exchanging control signals between the master camera and the slave cameras.

Next, the flow of control between cameras is described with reference to the sequence diagram shown in FIGS. 3A and 3B, with regard to the case of executing a collaborative operation between the master camera and the slave cameras, that is, collaborative shooting in the present embodiment. Note that a description is given assuming that a network is constructed in advance in FIGS. 3A and 3B, with the camera 100 serving as a master camera, and the other three cameras 101, 102, and 103 serving as slave cameras. Therefore, network addresses of the slave cameras 101 to 103 and the like are registered in the master camera 100, and the network address of the master camera 100 and the like are registered in the slave cameras 101 to 103. Note that collaborative shooting of the master camera 100 will be described below as an example of a prescribed operation that is performed in collaboration. Therefore, the operation input to instruct the master camera 100 (the remote controller 104) serving as a control apparatus to perform a prescribed operation is assumed to be the pressing of the release button.

If the release button SW1 of the master camera 100 is pressed (S301), the master camera 100 simultaneously transmits (performs multiple address transmission/multicasts or broadcasts) a SW1 ON command to the other three slave cameras. Further, the master camera 100 performs AF control and AE control as shooting preparation. At this time, each of the slave cameras 101, 102, and 103 that have received the SW1 ON command performs AF control and AE control as shooting preparation (S302). Next, if the release button SW2 of the master camera 100 is pressed (S303), the master camera 100 multicasts or broadcasts a SW2 ON command to the other three slave cameras, and starts shooting. At this time, each of the slave cameras 101, 102, and 103 that have received the SW2 ON command starts shooting (S304). FIGS. 3A and 3B show the case where a continuous shooting mode is set as a shooting mode of the cameras, and shooting is repeated at a fixed interval while SW2 is kept ON.

Next, if the release button SW2 of the master camera 100 is released (S305), shooting is stopped, and the master camera 100 also individually transmits (performs single transmission/unicasts) a SW2 OFF command to the other three registered slave cameras. First, the master camera 100 transmits the SW2 OFF command to the slave camera 101, and confirms reception of an Ack command, which is a command reception confirmation signal, from the slave camera 101. Similarly, the master camera 100 also transmits the SW2 OFF command to the slave cameras 102 and 103 individually, and confirms reception of the Ack commands. At this time, each of the slave cameras that have received the SW2 OFF command stops shooting, and returns the Ack command indicating SW2 OFF command reception confirmation to the master camera. Here, the master camera 100 retransmits the SW2 OFF command to a slave camera whose Ack command has not been received and thus cannot be confirmed. Examples of the case where reception of the Ack command cannot be confirmed includes the case where a slave camera failed to receive the SW2 OFF command from the master camera 100 due to a certain factor, and the case where the master camera 100 failed to receive the Ack command from a slave camera.

Figure 3A:
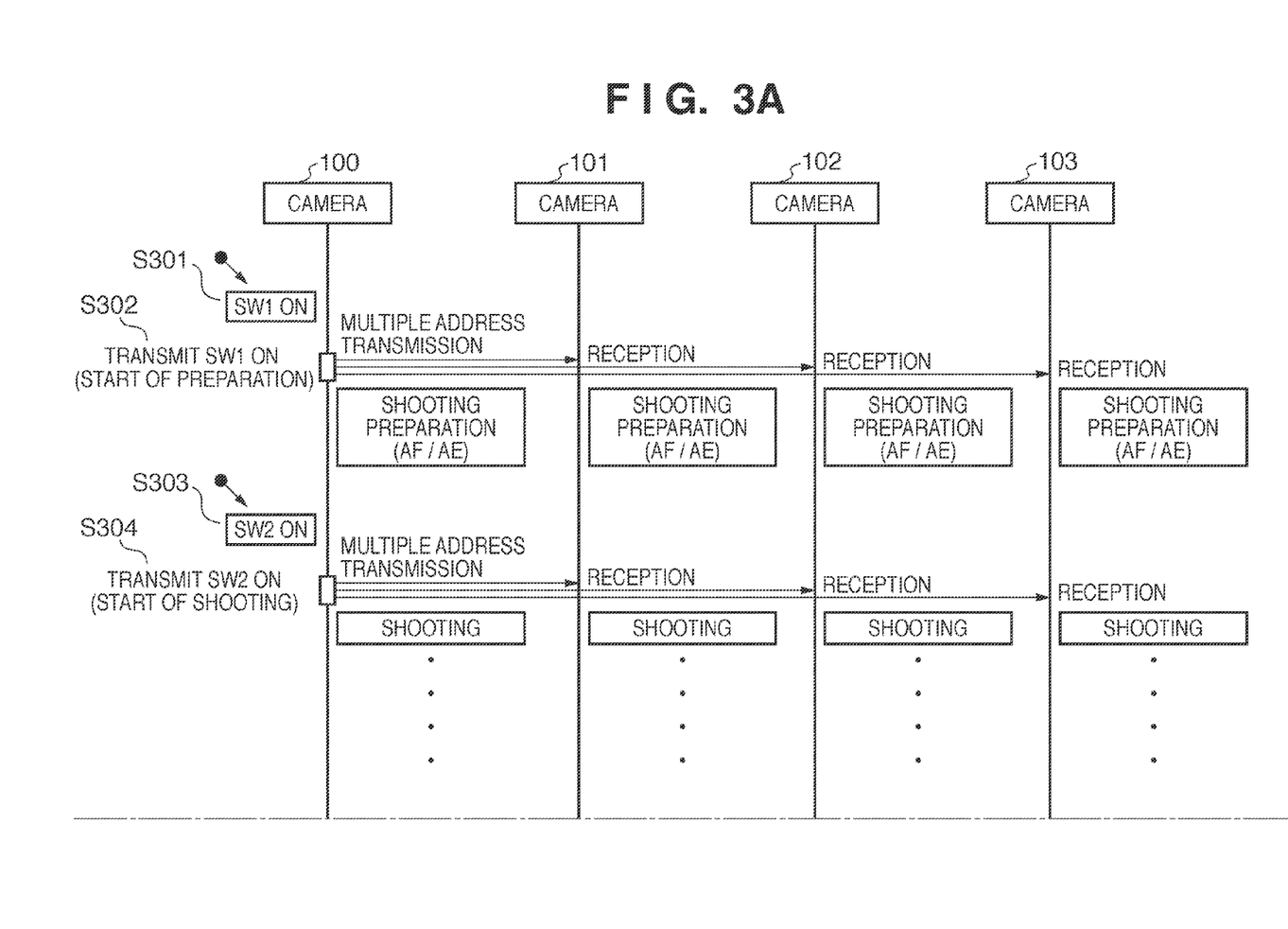
FIGS. 3A and 3B are sequence diagrams of a camera system according to a first embodiment.
Figure 3B:
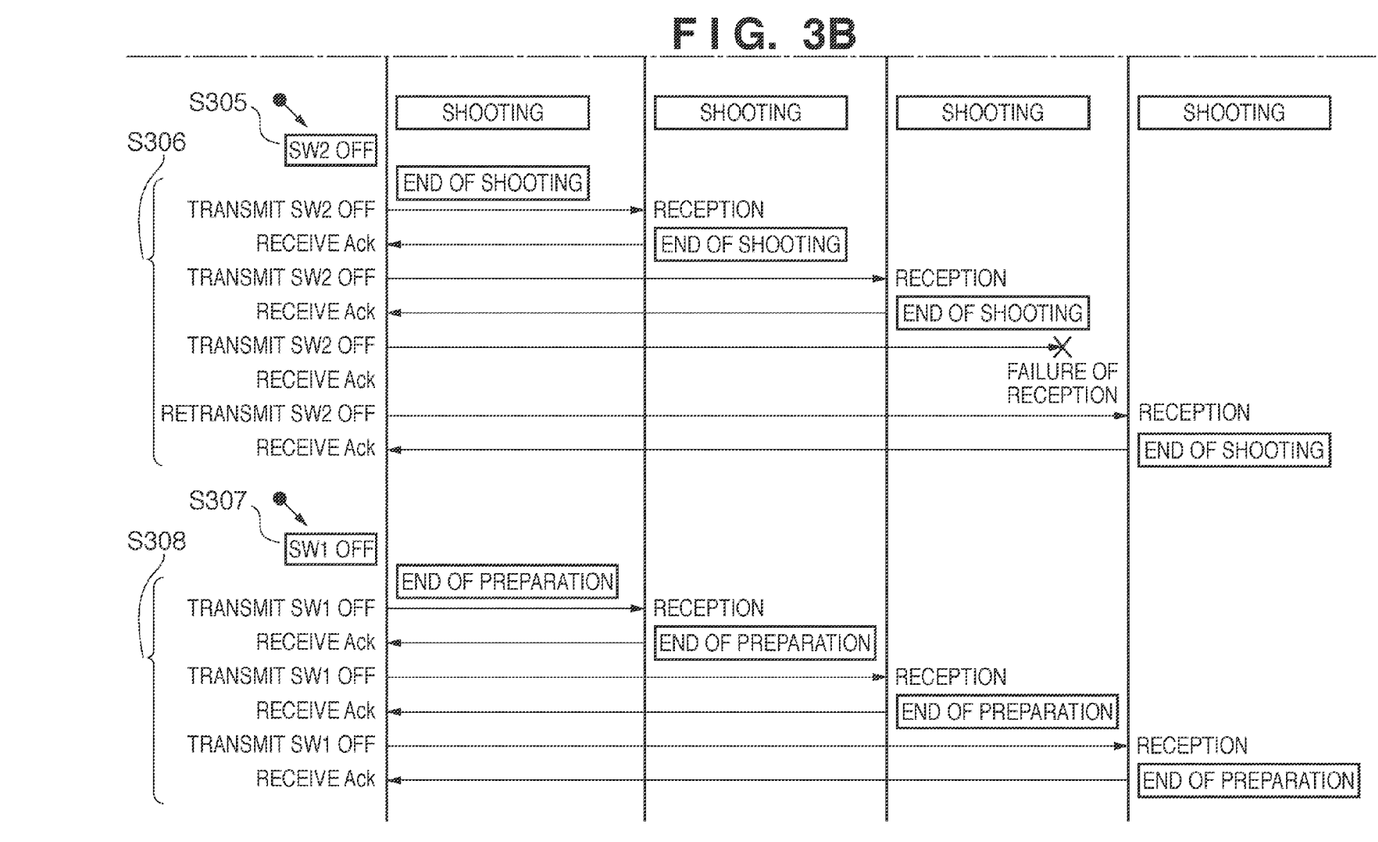

FIGS. 3A and 3B show the case where the SW2 OFF command is retransmitted to the slave camera 103 since the Ack command from the slave camera 103 could not be confirmed (S306).

Next, if the release button SW1 of the master camera 100 is released (S307), the master camera 100 stops shooting preparation, and also unicasts a SW1 OFF command individually to the other three registered slave cameras. First, the master camera 100 transmits the SW1 OFF command to the slave camera 101, and confirms reception of the Ack command, which is a command reception confirmation signal, from the slave camera 101. Similarly, the master camera 100 also transmits the SW1 OFF command to the slave cameras 102 and 103 individually, and confirms reception of Ack commands. At this time, the slave cameras that have received the SW1 OFF command stop shooting preparation, and return the Ack command that indicates SW1 OFF command reception confirmation to the master camera 100. Here, the master camera 100 retransmits the SW2 OFF command to a slave camera whose Ack command has not been received and thus cannot be confirmed (S308). Examples of the case where reception of the Ack command cannot be confirmed are as described above.

Figure 5A:
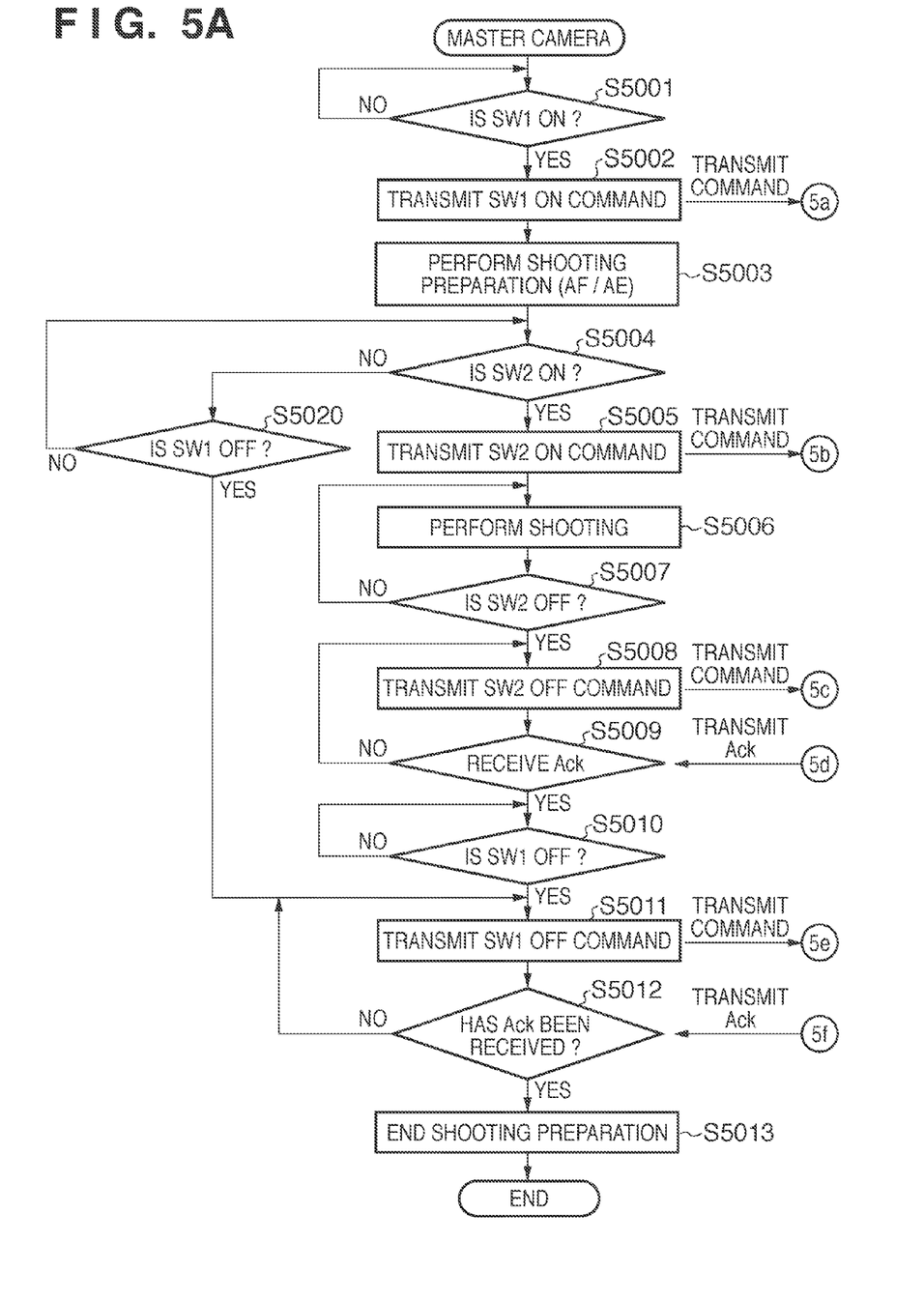
FIGS. 5A and 5B are flowcharts showing processing performed by cameras in the first embodiment.
Figure 5B:
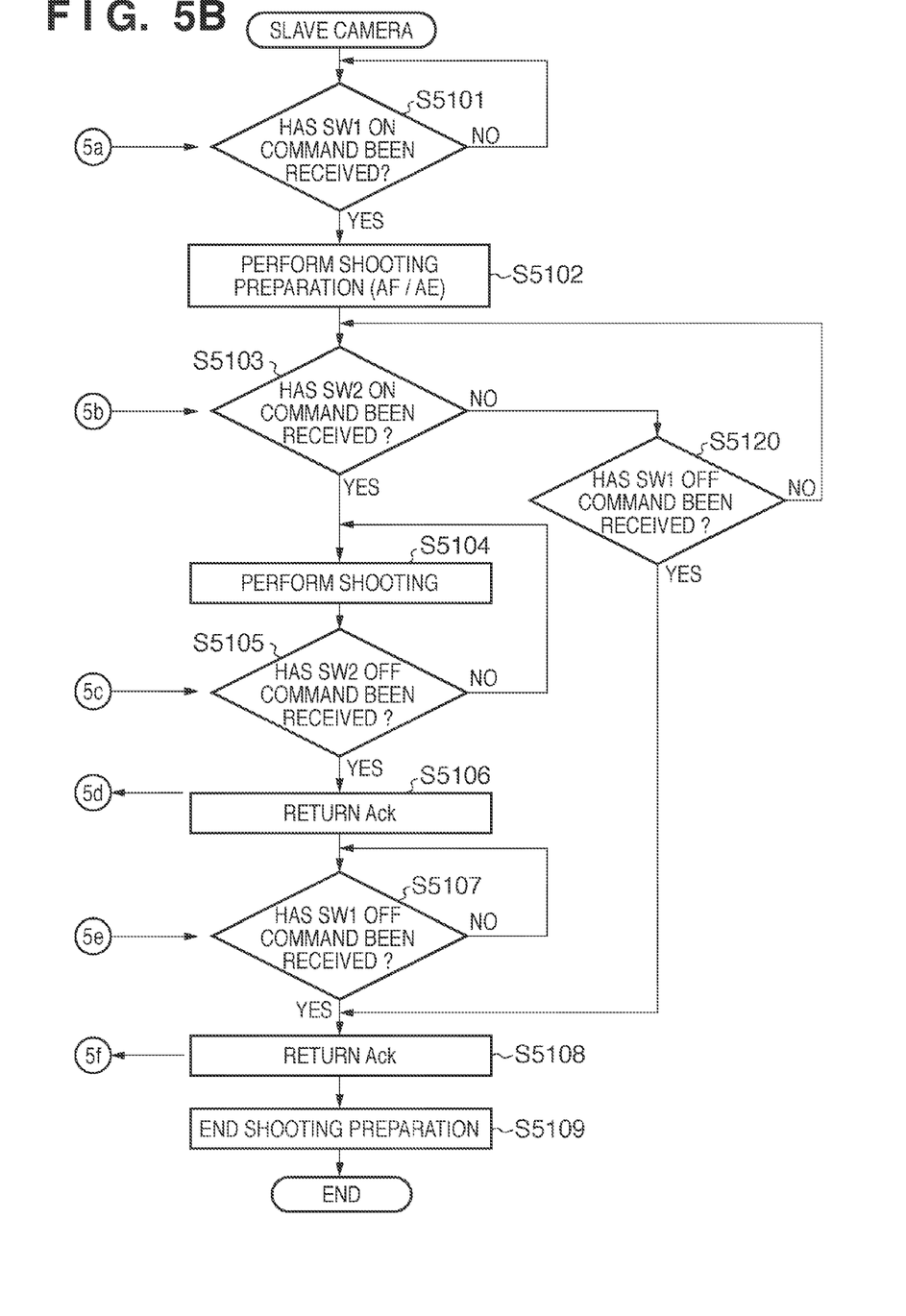

Next is a description of processing respectively performed by the master camera and the slave cameras with reference to the flowcharts in FIGS. 5A and 5B.

FIG. 5A is a flowchart of processing performed by the master camera and FIG. 5B is a flowchart of processing performed by the slave cameras, when performing collaborative shooting. First, in step S5001, the camera microprocessor 223 confirms whether or not the release button SW1 is being pressed. If it is determined that SW1 is being pressed, the processing proceeds to step S5002, where the camera microprocessor 223 controls the wireless communication circuit 202 to transmit the SW1 ON command to all the slaves by multicast or broadcast. Next, the processing proceeds to step S5003, where the camera microprocessor 223 controls the focus detection circuit 203 and the photometry circuit 204 to perform focus adjustment (AF) and exposure computation (AE) as a shooting preparation operation. Next, the processing proceeds to step S5004, where the camera microprocessor 223 confirms whether or not the release button SW2 is being pressed. If it is determined that SW2 is being pressed, the processing proceeds to step S5005, where the camera microprocessor 223 controls the wireless communication circuit 202 to transmit the SW2 ON command to all the slaves by multicast or broadcast. If SW2 is not being pressed in step S5004, the processing proceeds to step S5020, where it is confirmed whether or not the release button SW1 is being pressed. If it is determined that SW1 is being pressed, the processing returns to step S5004, and then confirmation of pressing of the release button is continued. If it is determined in step S5020 that SW1 has been released, the processing proceeds to step S5011. Processing in step S5011 and steps thereafter will be described later.

When processing in step S5005 ends, the processing next proceeds to step S5006, where the camera microprocessor 223 drives the shutter control circuit 208 to perform a known shooting operation. Next, the processing proceeds to step S5007, where the camera microprocessor 223 confirms whether or not the release button SW2 has been released. If the camera microprocessor 223 determines that SW2 continues to be pressed, since the continuous shooting mode is set in the present embodiment, the processing returns to step S5006, and shooting is repeated (continuous shooting is performed) if the conditions allow shooting. If a single shooting mode for shooting only one frame is set instead of the continuous shooting mode, confirmation of SW2 will be continued in step S5007. If the camera microprocessor 223 determines in step S5007 that SW2 has been released, the processing proceeds to step S5008.

In step S5008, the camera microprocessor 223 controls the wireless communication circuit 202 to individually transmit (perform single transmission/unicast) the SW2 OFF command to the connected cameras. Then, in step S5009, reception of the Ack command from the cameras, which are the transmission destinations of the SW2 OFF command, is confirmed. If the Ack command is not received from a camera, transmission of the SW2 OFF command and confirmation of the Ack command (S5008 and S5009) are repeated with respect to that camera. Processing in steps S5008 and S5009 is repeated with respect to all the connected cameras. Note that it is assumed that the cameras that are connected are registered in the master camera 100 when a network is constituted.

Next, the processing proceeds to step S5010, where the camera microprocessor 223 confirms whether or not the release button SW1 has been released. If it is determined that SW1 has been released, the processing proceeds to step S5011. In step S5011, the camera microprocessor 223 controls the wireless communication circuit 202 to individually transmit (perform single transmission/unicast) the SW1 OFF command to the connected cameras. Then, in step S5012, reception of the Ack command from the cameras, which are the transmission destinations of the SW1 OFF command, is confirmed. If the Ack command is not received from a camera, transmission of the SW1 OFF command and confirmation of the Ack command (S5011 and S5012) are repeated with respect to that camera. Processing in steps S5011 and S5012 is repeated with respect to all the connected cameras. Through this processing, the OFF command will be retransmitted to a slave camera whose Ack command cannot be confirmed by unicast (this has been described above with regard to S306). Next, the processing proceeds to step S5013, where the camera microprocessor 223 ends the shooting preparation operation, and ends the series of shooting operations.

On the other hand, processing performed by the slave cameras when performing collaborative shooting is as follows. First, in step S5101, the camera microprocessor 223 controls the wireless communication circuit 202 to confirm whether or not the SW1 ON command has been received. If the SW1 ON command has been received, the processing proceeds to step S5102, where the focus detection circuit 203 and the photometry circuit 204 are controlled so as to respectively perform focus adjustment (AF) and exposure computation (AE) as the shooting preparation operation. Next, the processing proceeds to step S5103, where the camera microprocessor 223 controls the wireless communication circuit 202 to confirm whether or not the SW2 ON command has been received. If the SW2 ON command has been received, the processing proceeds to step S5104. If the SW2 ON command has not been received in step S5103, the processing proceeds to step S5120, where it is confirmed whether or not the SW1 OFF command has been received. If the SW1 OFF command has also not been received, the processing returns to step S5103, and the slave camera continues to wait for command reception from the master camera. If it is determined in step S5120 that the SW1 OFF command has been received, the processing proceeds to step S5108. Processing in step S5108 and steps thereafter will be described later.

If the SW2 ON command is received in step S5103, the processing proceeds to step S5104, where the camera microprocessor 223 drives the shutter control circuit 208 to perform a shooting operation. Next, the processing proceeds to step S5105, where the camera microprocessor 223 controls the wireless communication circuit 202 to confirm reception of the SW2 OFF command. If it has not been received, the camera microprocessor 223 determines that SW2 has been kept ON. Since the continuous shooting mode is set in the present embodiment, the processing returns to step S5104, and shooting is repeated if the conditions allow shooting. If the single shooting mode for shooting only one frame is set instead of the continuous shooting mode, the slave camera continues to wait to receive the SW2 OFF command in step S5105. Next, if the SW2 OFF command is received in step S5105, the processing proceeds to step S5106, where the camera microprocessor 223 controls the wireless communication circuit 202 to transmit the Ack command to the master camera 100. Then, if the SW1 OFF command is received, the processing proceeds from step S5107 to step S5108, where the camera microprocessor 223 controls the wireless communication circuit 202 to transmit the Ack command to the master camera 100. Then, the processing proceeds to step S5109, where the camera microprocessor 223 ends the shooting preparation operation, and ends the series of shooting processes.

Note that in the above processing procedure, with regard to transmission of the SW2 OFF command or the SW1 OFF command from the master camera 100 to the slave cameras 101, 102, and 103, a command is transmitted to the next camera after obtaining confirmation by receiving the Ack command. For example, the master camera 100 transmits the SW2 OFF command to the slave camera 101, and does not transmit the SW2 OFF command to the slave camera 102 until reception of the Ack command is confirmed. However, the present invention is not limited to this procedure, and transmission of the OFF command and confirmation of Ack command reception may be performed independently with respect to each slave camera. For example, a configuration may be adopted in which even if reception of the Ack command for the SW2 OFF command from the slave camera 101 cannot be confirmed, the SW2 OFF command can be transmitted to the slave camera 102. Further, even if Ack for the SW2 OFF command has not been received from all the slave cameras, the SW1 OFF command may be transmitted to the slave cameras whose Ack command for the SW2 OFF command has been received and confirmed.

As described above, collaborative shooting in the present embodiment is realized by exchanging the SW1/SW2 ON commands as collaborative shooting control start signals and the SW2/SW1 OFF commands as control end signals between the master camera and the slave cameras. Here, the control start signals are transmitted from the master camera serving as a control apparatus to multiple addresses (multicast or broadcast), that is, to a plurality of slave cameras serving as the control target apparatus. This achieves prevention of the time lag of the control start signals and variations in the control time lag between the control target apparatus being generated. Specifically, if a control start signal is a command for instructing to start collaborative shooting, the time lag of the collaborative operation start between the master camera serving as a control apparatus and the slave cameras serving as the control target apparatus, and variations in the time lags between the slave cameras are suppressed. Further, the master camera serving as a control apparatus performs single transmission (unicast transmission) of a control end signal to the plurality of slave cameras serving as the control target apparatus, and confirms an acknowledgement signal from each of the slave cameras serving as the control target apparatus. Thereby, a control end signal can be reliably transmitted to the slave cameras, and control end processing with respect to the slave cameras can be reliably executed.

Second Embodiment

Below, a second embodiment of the present invention is described. First, the flow of control in the second embodiment in the case where collaborative shooting is executed between the master camera and the slave cameras is described with reference to the sequence diagram shown in FIGS. 4A and 4B. Note that the configuration of the camera system of the present embodiment, and the configuration of the cameras are the same as those in FIGS. 1 and 2, which are described in the first embodiment, and thus a description thereof is omitted. A description is given assuming that a network is constructed in advance in FIGS. 4A and 4B, with the camera 100 serving as a master camera, and the other three cameras 101, 102, and 103 serving as slave cameras.

Figure 4A:
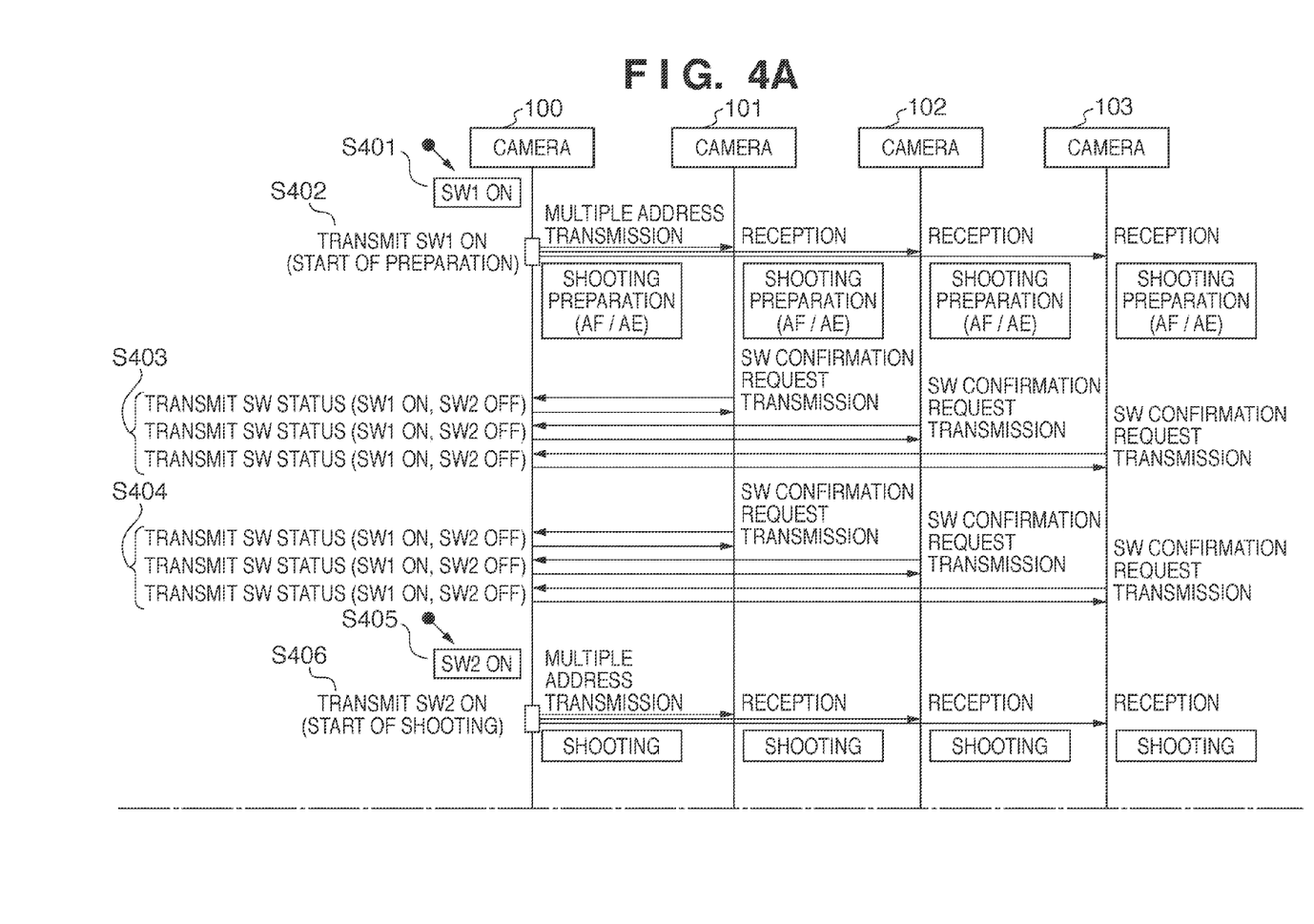
FIGS. 4A and 4B are sequence diagrams of a camera system according to a second embodiment.
Figure 4B:
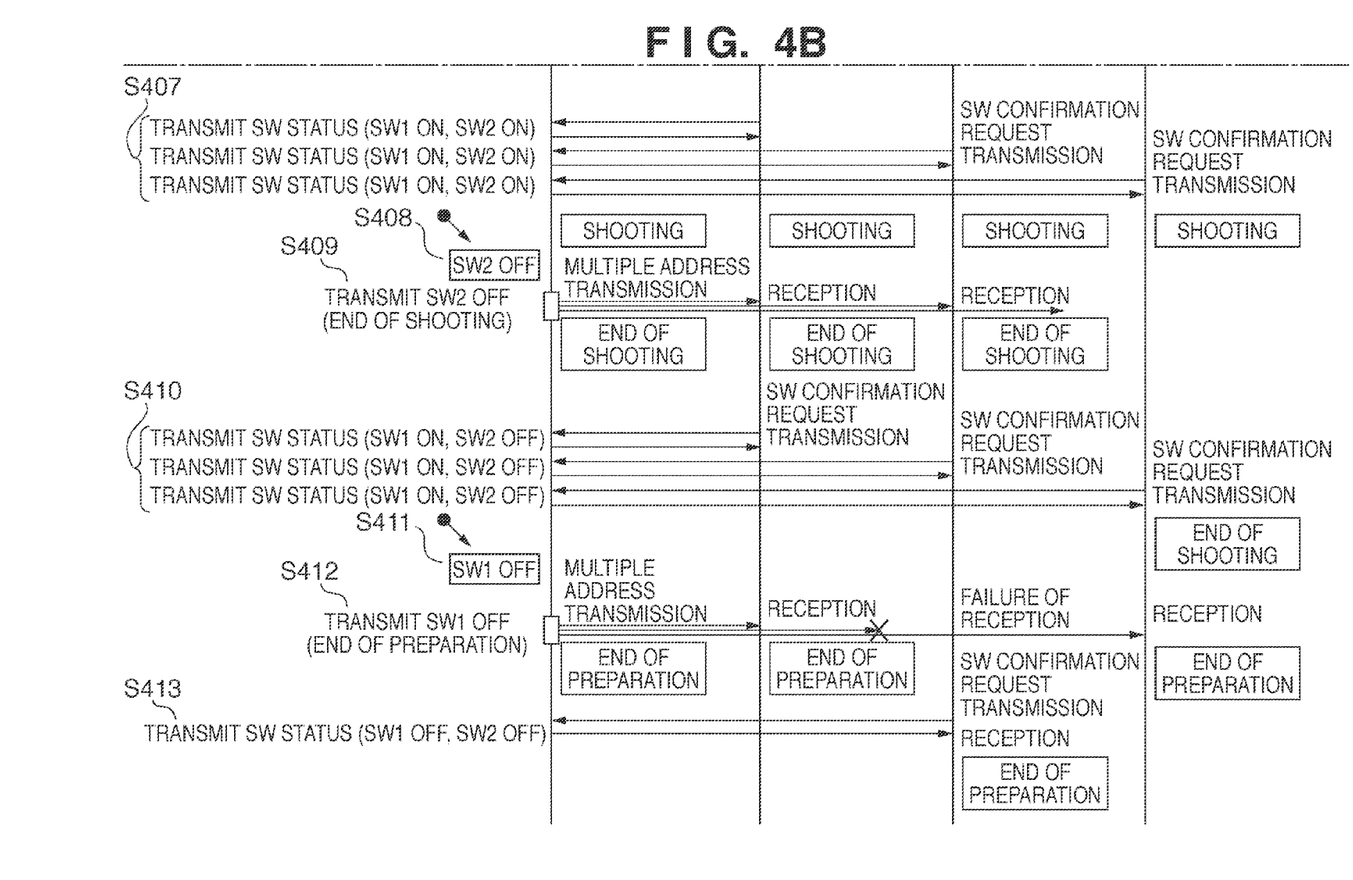

If the release button SW1 of the master camera 100 is pressed (S401), the master camera 100 simultaneously transmits (performs multiple address transmission/multicasts or broadcasts) the SW1 ON command to the other three slave cameras. Further, the master camera 100 performs AF control and AE control as shooting preparation. At this time, each of the slave cameras 101, 102, and 103 that have received the SW1 ON command performs AF control and AE control as shooting preparation (S402). Upon receipt of the SW1 ON command, the slave cameras transmit a SW confirmation request command to the master camera 100 (S403). This SW confirmation request command is a command used by the slave cameras to request and confirm the SW1/SW2 status (shooting status) of the master camera 100. Upon receipt of the SW confirmation request command, the master camera 100 transmits the SW1/SW2 status (shooting status) to the slave camera that transmitted the SW confirmation request command. At the point in time of step S403, since the status is SW1 ON and SW2 OFF, the master camera 100 transmits to that slave camera "SW1 ON and SW2 OFF" as a response signal. This SW confirmation request command is periodically issued to the master camera by a slave camera that has received the SW1 ON command or the SW2 ON command (S404). Further, the SW confirmation request command continues to be periodically issued as long as the shooting status of the slave camera is SW1 ON or SW2 ON status.

Next, if the release button SW2 of the master camera 100 is pressed (S405), the master camera 100 multicasts or broadcasts the SW2 ON command to the other three slave cameras, and starts shooting. At this time, each of the slave cameras

101, 102, and 103 that have received the SW2 ON command starts shooting (S406). FIGS. 4A and 4B show the case where the continuous shooting mode is set as the shooting mode of each of the cameras, and shooting is repeated at a fixed interval while SW2 is kept ON. Furthermore, the slave cameras transmit the SW confirmation request command to the master camera 100 periodically. The master camera 100 transmits "SW1 ON and SW2 ON" to the slave cameras as a response signal (S407).

Next, when the release button SW2 of the master camera 100 is released (S408), the master camera 100 stops shooting, and also multicasts or broadcasts the SW2 OFF command to the other three slave cameras (S409). The slave cameras that have received the SW2 OFF command stop shooting. Here, if a slave camera fails to receive the SW2 OFF command from the master camera 100 due to a certain factor, shooting will be continued. However, since the slave cameras periodically transmit the SW confirmation request command to the master camera 100, it is possible to confirm that SW2 has been turned OFF based on the response from the master camera 100 to the SW confirmation request command (S410). FIGS. 4A and 4B show the case where the slave camera 103 fails to receive the SW2 OFF command in S409. In S410, "SW1 ON and SW2 OFF" is transmitted to that slave camera as a response signal to the SW confirmation request command, and the slave camera 103 determines that SW2 has been turned OFF by the content of the signal, and stops shooting.

Next, when the release button SW1 of the master camera 100 is released (S411), the master camera 100 stops shooting preparation, and also multicasts or broadcasts the SW1 OFF command to the other three slave cameras (S412). At this time, each of the slave cameras that have received the SW1 OFF command stops shooting preparation. Here, if a slave camera fails to receive the SW1 OFF command from the master camera 100 due to a certain factor, shooting preparation will be continued. However, since the slave cameras periodically transmit the SW confirmation request command to the master camera 100, it is possible to confirm that SW1 has been turned OFF based on the response from the master camera 100 to the SW confirmation request command (S413). FIGS. 4A and 4B show the case where the slave camera 102 fails to receive the SW1 OFF command in S412. In S413, "SW1 OFF and SW2 OFF" is transmitted to the slave camera as a response signal to the SW confirmation request command, and the slave camera 102 confirms that SW1 has been turned OFF based on that response, and stops shooting preparation.

Next is a description of processing performed by the master camera and the slave cameras according to the second embodiment with reference to the flowcharts in FIGS. 6A, 6B, 7A, and 7B.

Figure 6A:
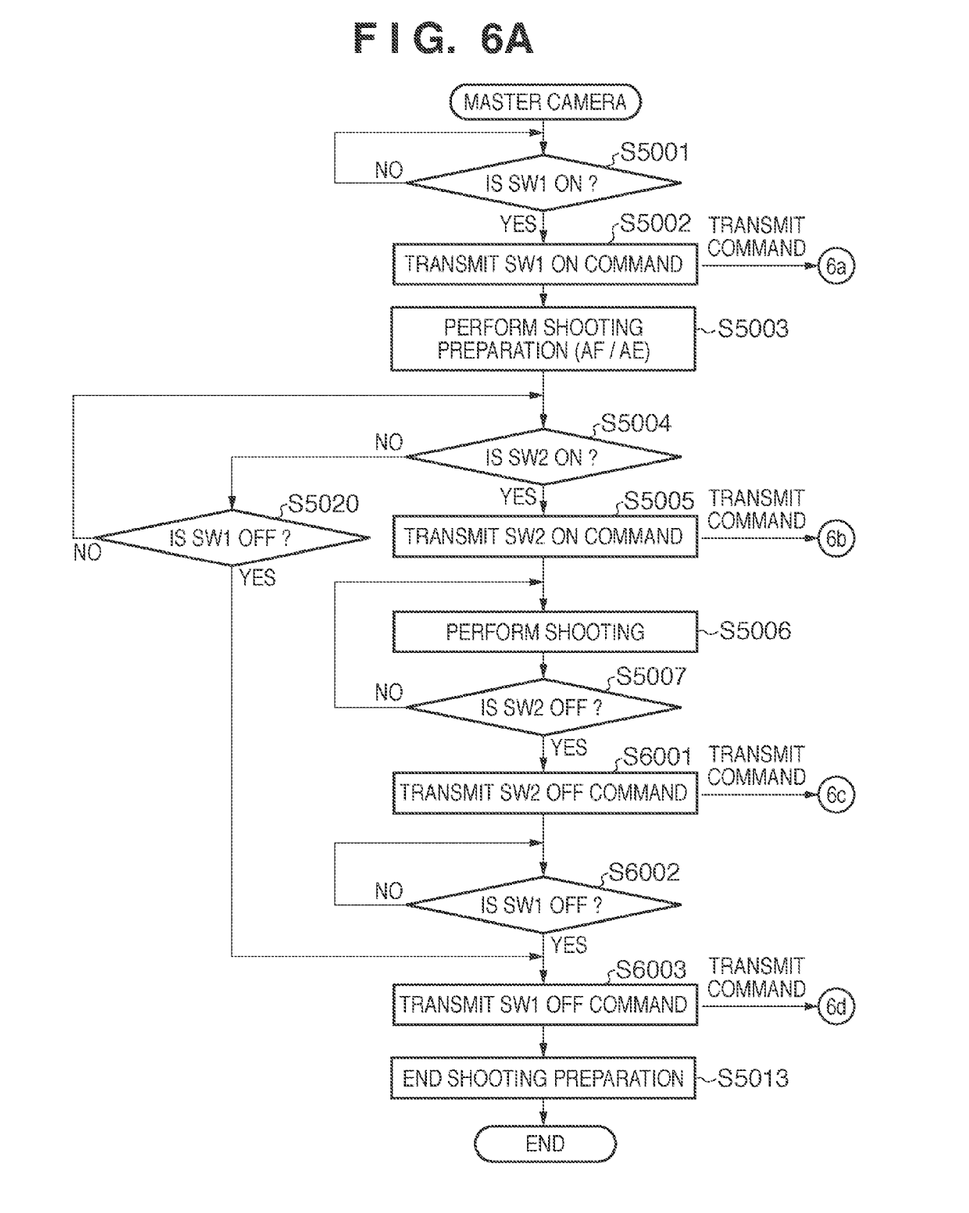
FIGS. 6A and 6B are flowcharts showing processing performed by cameras in the second embodiment.
Figure 6B:
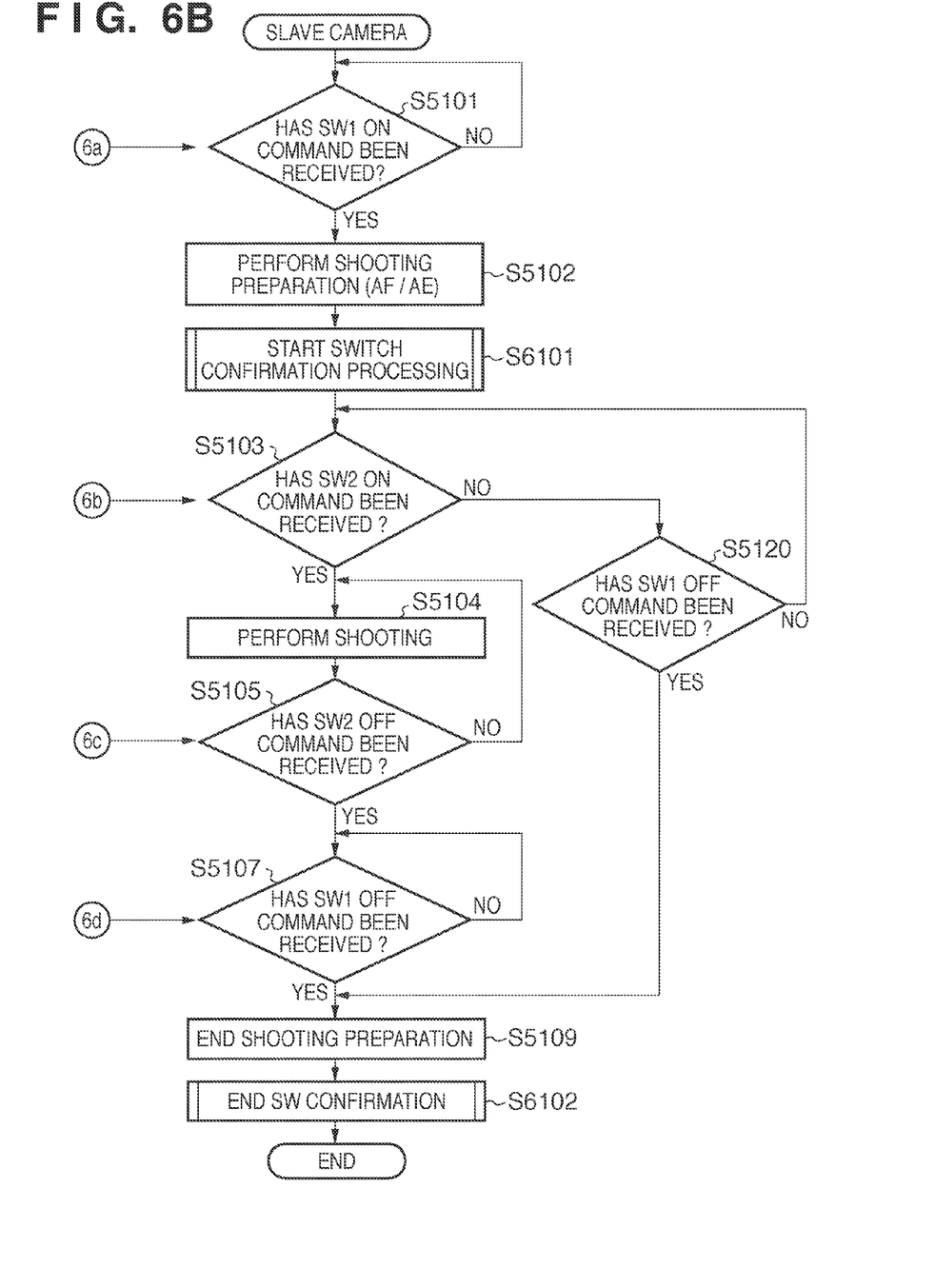

FIG. 6A shows processing performed by the master camera and FIG. 6B shows processing performed by the slave cameras, when performing collaborative shooting. First, processing performed by the master camera is described with reference to FIG. 6A. Processing in steps S5001 to S5007 and S5020 is the same as that of the first embodiment (FIG. 5A). However, if it is determined in step S5020 that the release button SW1 has been released (SW1 is turned OFF), the processing proceeds to step S6003. Further, if the camera microprocessor 223 determines in step S5007 that SW2 has been released, in step S6001, the camera microprocessor 223 controls the wireless communication circuit 202 to perform multicasting or broadcasting in order to transmit the SW2 OFF command to all the slaves. Next, the processing proceeds to step S6002, where the camera microprocessor 223 confirms whether or not the release button SW1 has been released. If it is determined that SW1 has been released, the processing proceeds to step S6003, where the camera microprocessor 223 controls the wireless communication circuit 202 to perform multicasting or broadcasting in order to transmit the SW1 OFF command to all the slaves. Next, the processing proceeds to step S5013, where the shooting preparation operation ends, and the series of shooting operations ends.

Figure 7A:
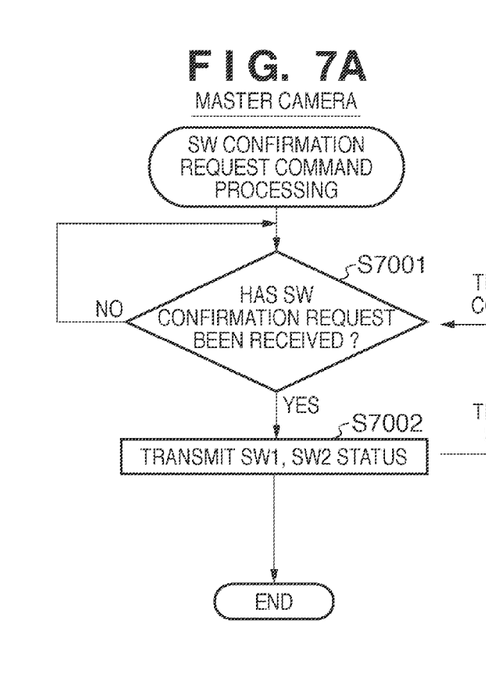
FIGS. 7A and 7B are flowcharts showing processing performed by the cameras in the second embodiment.

FIG. 7A shows processing performed when the master camera 100 receives a command from a slave camera, and particularly shows processing performed in the case of receiving the SW confirmation request command. Note that processing in FIG. 7A is performed by the master camera in parallel to the processing in FIG. 6A, and the master camera is configured such that a command can also be received from the slave cameras while performing a shooting operation. If the SW confirmation request command is received from a slave camera in step S7001, the processing proceeds to step S7002. In step S7002, the camera microprocessor 223 transmits, to the slave camera that transmitted the SW confirmation request command, the ON/OFF status (shooting status) of the release button SW1/SW2 at the point in time of receiving the SW confirmation request command.

Next is a description of processing performed by the slave cameras 101 to 103 when performing collaborative shooting with reference to FIG. 6B. Note that although a description is given below with regard to the slave camera 101, the other slave cameras also perform the same processing. Processing in steps S5101 to S5105, S5107, S5109, and S5120 is the same processing as that in the first embodiment (FIG. 5B). In the second embodiment, the slave camera 101 starts shooting preparation upon receipt of the SW1 ON command (S5102), and also starts SW confirmation processing that will be described later with reference to FIG. 7B (S6101). Further, transmission of the Ack command after receiving the SW2 OFF command and after receiving the SW1 OFF command is not performed. When shooting preparation ends in step S5109, in step S6102, the camera microprocessor 223 ends the SW confirmation processing started in step S6101, and ends the series of shooting processes.

Figure 7B:
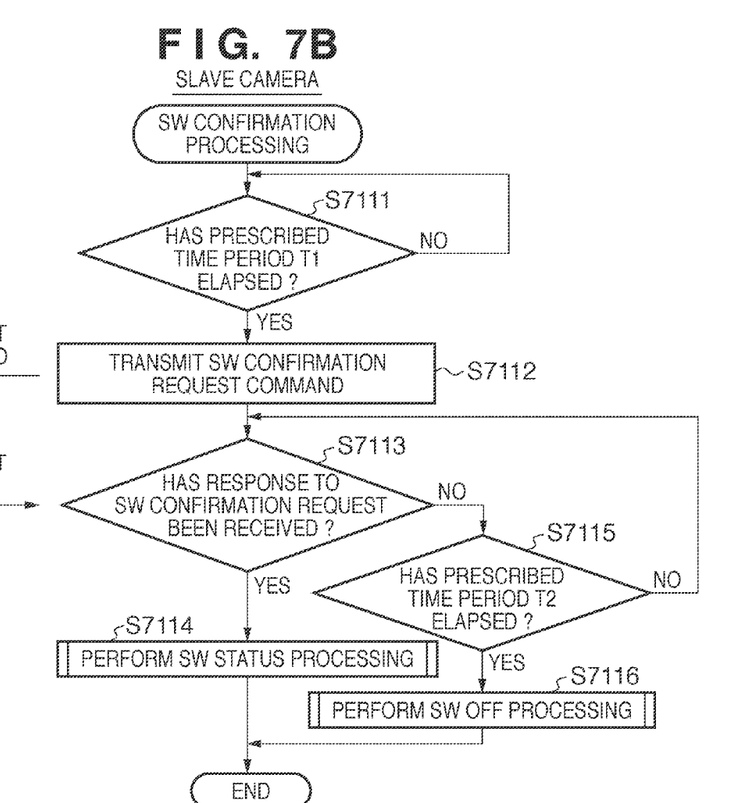

Next is a description of the SW confirmation processing started in step S6101 with reference to FIG. 7B. FIG. 7B shows processing executed when the slave cameras receive the SW1 ON command and the SW2 ON command from the master camera. As described with reference to FIG. 6B, that processing is started in step S6101, and continues to be repeatedly executed while the slave cameras are performing a shooting operation. If the SW confirmation processing is started, in step S7111, the camera microprocessor 223 first determines whether or not a prescribed time period T1 has elapsed. Here, the prescribed time period T1 is the length of the cycle for executing the SW confirmation processing periodically in the case where the slave camera starts a shooting operation upon receipt of the SW1 ON command, and a cycle of 500 ms or the like, for example, is measured by the camera microprocessor 223. Note that processing in FIG. 7B is performed in parallel to the processing in FIG. 6B, and the slave cameras are constituted such that a command can be periodically transmitted to the master camera even while performing a shooting operation.

If the prescribed time period T1 has elapsed in step S7111, the processing proceeds to step S7112, where the camera microprocessor 223 controls the wireless communication circuit 202 to transmit the SW confirmation request command to the master camera 100. The operation of the master camera 100 at the time of receiving the SW confirmation request command is as previously described with reference to FIG.

7A. The camera microprocessor 223 transmits the SW confirmation request command in step S7112, and confirms in step S7113 whether or not a response signal to the SW confirmation request command from the master camera has been received. Confirmation of the reception of a response signal to this SW confirmation request command is performed during a time period T2, which is a very short time period, as shown in step S7115. If a response signal is not received in step S7113, the processing proceeds to step S7115, where it is confirmed whether or not the prescribed time period T2 has elapsed after transmitting the SW confirmation request command (S7112). If the prescribed time period T2 has elapsed, the processing proceeds to step S7116, where the same processing as that in the case where the SW OFF command has been received is performed, assuming that reception of a response signal to the SW confirmation request command failed. Specifically, if the slave camera is performing shooting performed by repeatedly executing processing in steps S5104 and S5105, the same processing as that in the case where the SW2 OFF command and the SW1 OFF command have been received is performed. Note that although it is assumed that SW OFF processing is performed if the prescribed time period T2 has elapsed even one time in step S7115 in FIG. 7B, the present invention is not limited thereto. For example, a configuration may be adopted in which the processing proceeds to step S7116 in the case where reception of a response signal to the SW confirmation request fails even after processing in steps S7112, S7113, and S7115 has been repeated for a prescribed number of times. Further, in the SW OFF processing in step S7116, the same processing as in the case where the SW1 OFF command has been received is performed if the slave camera is waiting to receive the SW1 OFF command in step S5107. On the other hand, if a response signal to the SW confirmation request command is received in step S7113, the processing proceeds to step S7114, where the camera microprocessor 223 performs SW status processing. The SW status processing differs depending on the status of the slave camera and the content of the response signal, and descriptions of the conditions are given below.

- If a response signal received during shooting performed by repeatedly executing processing in steps S5104 and S5105 indicates "SW1 ON and SW2 ON", shooting processing is continued.
- If a response signal received during shooting performed by repeatedly executing processing in steps S5104 and S5105 indicates "SW1 ON and SW2 OFF", shooting ends assuming that reception of the SW2 OFF command failed in step S5105, and the processing proceeds to step S5107.
- If a response signal received during shooting performed by repeatedly executing processing in steps S5104 and S5105 indicates "SW1 OFF and SW2 OFF", it is determined that reception of the SW2 OFF command in step S5105 and reception of the SW1 OFF command in step S5107 failed. Therefore, the camera microprocessor 223 ends shooting, and proceeds the processing to step S5109.
- If a response signal received while waiting to receive the SW1 OFF command in step S5107 indicates "SW1 ON and SW2 OFF", SW1 OFF command reception waiting processing is continued.
- If a response signal received while waiting to receive the SW1 OFF command in step S5107 indicates "SW1 OFF and SW2 OFF", the processing proceeds to step S5109, assuming that reception of the SW1 OFF command in step S5107 failed.

As described above, the collaborative shooting performed in the present embodiment is realized by exchanging the SW1/SW2 ON commands as collaborative shooting control start signals and the SW2/SW1 OFF commands as control end signals between the master camera and the slave cameras.

Here, the master camera serving as a control apparatus distributes a control start signal and a control end signal to a plurality of slave cameras serving as the control target apparatus, by performing multiple address transmission (multicast or broadcast). This achieves prevention of variations in the control time lag between the control target apparatus being generated, and simplifies processing performed by the master camera serving as a control apparatus. Further, the master camera serving as a control apparatus transmits a control end signal to a plurality of slave cameras serving as the control target apparatus, by performing multiple address transmission (multicast or broadcast). At this time, the slave cameras serving as the control target apparatus transmit a confirmation request about a control signal to the master camera serving as a control apparatus. Therefore, even if reception of a control end signal fails, the slave cameras serving as the control target apparatus can reliably perform control end processing.

Although preferred embodiments of the present invention have been described above, the present invention is not limited to these embodiments, and various modifications and changes can be made within the gist thereof.

For example, it is possible to adopt a configuration in which a combination of processing for control start/end commands described in the first embodiment and processing for control start/end commands described in the second embodiment is used.

Further, although the embodiments of the present invention described the case of cameras with the control apparatus being an image capturing apparatus, the present invention is not limited to this configuration, and a configuration need only be adopted such that a control apparatus constructs a network with a plurality of image capturing apparatus via communication means and performs control, as in the case of the remote controller shown in FIG. 1B.

Further, although the embodiments of the present invention described the case of a network constituted by one group including the master camera 100 and the slave cameras 101 to 103, the present invention is not limited thereto. For example, even in the case where the master camera serving as a control apparatus can construct a plurality of groups in a network, the same processing can be applied to be performed by each group.

Further, although the embodiments of the present invention described the case where the release button SW1/SW2 ON/OFF commands are transmitted as control start/end signals from the control apparatus to the plurality of image capturing apparatus, thereby controlling shooting, the present invention is not limited to "release" that can be controlled by control start/end signals. Specifically, the present invention is applicable to control for starting and ending a prescribed function of an image capturing apparatus. For example, as an example of the operation of the control target apparatus controlled by the control apparatus, the present invention is applicable to a camera system that is configured such that viewfinder display (through image display) of the slave camera is received by the control apparatus, and can be displayed by the control apparatus. In this case, the processing described above is applicable to control of the start and end of the through image display of the slave camera, and is effective.

Further, although the case where the control apparatus is an image capturing apparatus and processing apparatus connected to the control apparatus are image capturing apparatus has been described in the embodiments described above, the present invention is not limited thereto. That is, it is evident that the present invention is applicable to a control system in which at least one processing apparatus is connected to a control apparatus.

As described above, according to the embodiments, it is possible to secure a response and communication reliability in a system for controlling at least one image capturing apparatus using a control apparatus.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, non-transitory computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-199019, filed Aug. 28, 2009, which is hereby incorporated by reference herein in its entirety.

What is claimed is:

1. A control apparatus configured to be connected to at least one image capturing apparatus by wireless communication, the control apparatus comprising:
a detection unit configured to detect an operation that is made by a user;
a transmission unit configured to transmit, by multicast or broadcast via the wireless communication, a command for instructing to start a prescribed operation to each image capturing apparatus that is connected to the control apparatus, in response to the detection unit detecting an operation for instructing to start the prescribed operation, and to transmit, by unicast via the wireless communication, a command for instructing to end the prescribed operation to each image capturing apparatus, in response to the detection unit detecting an operation for instructing to end the prescribed operation; and
a control unit configured to confirm a response from each image capturing apparatus to transmission of the command for instructing to end the prescribed operation, and to cause the transmission unit to retransmit, by unicast, a command for instructing to end the prescribed operation to each image capturing apparatus whose response is not confirmed.

2. A control apparatus configured to be connected to at least one image capturing apparatus by wireless communication, the control apparatus comprising:
a detection unit configured to detect an operation made by a user;
a transmission unit configured to transmit, by multicast or broadcast via the wireless communication, a command for instructing to start a prescribed operation to each image capturing apparatus that is connected to the control apparatus, in response to the detection unit detecting an operation for instructing to start the prescribed operation, and to transmit, by multicast or broadcast via the wireless communication, a command for instructing to end the prescribed operation to each image capturing apparatus, in response to the detection unit detecting an operation for instructing to end the prescribed operation; and
a response unit configured to transmit, in response to an inquiry about a status of the operation related to the prescribed operation that has been started in each, image capturing apparatus in response to reception of the command for instructing to start the prescribed operation, information that indicates the status of the operation to each image capturing apparatus from which the inquiry originated.

3. The control apparatus according to claim 1, further comprising an image capturing unit,
wherein the prescribed operation is an operation related to image capturing performed by the image capturing unit, and
the image capturing unit controls execution of the prescribed operation in response to the detection unit detecting the operation for instructing to start the prescribed operation and the operation for instructing to end the prescribed operation.

4. The control apparatus according to claim 3,
wherein the command for instructing to start the prescribed operation is a command to start continuous shooting that is performed by the image capturing unit, and the command for instructing to end the prescribed operation is a command to stop the continuous shooting that is performed by the image capturing unit.

5. A control system in which at least one image capturing apparatus and a control apparatus are configured to be connected by wireless communication, the control system comprising:
a detection unit, in the control apparatus, configured to detect an operation made by a user;
a transmission unit, in the control apparatus, configured to transmit, by multicast or broadcast via the wireless communication, a command for instructing to start a prescribed operation to each image capturing apparatus, in response to the detection unit detecting an operation for instructing to start the prescribed operation, and to transmit, by unicast via the wireless communication, a command for instructing to end the prescribed operation to each image capturing apparatus, in response to the detection unit detecting an operation for instructing to end the prescribed operation;
a processing unit, in each image capturing apparatus, configured to start the prescribed operation in response to reception of the command for instructing to start the prescribed operation that has been transmitted by the transmission unit, and to end the prescribed operation in response to reception of the command for instructing to end the prescribed operation that has been transmitted by the transmission unit, and transmit a response to the control apparatus; and
a control unit, in the control apparatus, configured to confirm the response that is transmitted from each image capturing apparatus, and to cause the transmission unit to retransmit, by unicast, the command for instructing to end the prescribed operation to each image capturing apparatus whose response is not confirmed.

6. A control system in which at least one image capturing apparatus and a control apparatus are configured to be connected by wireless communication, the control system comprising:
- a transmission unit, in the control apparatus, configured to transmit, by multicast or broadcast via the wireless communication, a command for instructing to start a prescribed operation to each image capturing apparatus, in response to detection of an operation for instructing to start the prescribed operation, and to transmit, by multicast or broadcast via the wireless communication, a command for instructing to end the prescribed operation to each image capturing apparatus, in response to detect on of an operation for instructing to end the prescribed operation;
- an execution unit, in each image capturing apparatus, configured to start the prescribed operation in response to reception of the command for instructing to start the prescribed operation, and transmit an inquiry about a status of the operation related to the prescribed operation to the control apparatus at a prescribed interval;
- a response unit, in the control apparatus, configured to transmit, in response to the inquiry about the status of the operation related to the prescribed operation from each image capturing apparatus, information that indicates the status of the operation to each image capturing apparatus from which the inquiry originated; and
- a stop unit, in each image capturing apparatus, configured to end the prescribed operation if the command for instructing to end the prescribed operation is received or if the information that indicates the status of the operation indicates end of the prescribed operation, and stop transmitting the inquiry.

7. A command transmission method to be performed by a control apparatus configured to be connected to at least one image capturing apparatus by wireless communication, for transmitting a command to the at least one image capturing apparatus, the command transmission method comprising:
- a transmission step of transmitting, by multicast or broadcast via the wireless communication, a command for instructing to start a prescribed operation to each image capturing apparatus that is connected to the control apparatus, in response to detection of an operation for instructing to start the prescribed operation, and transmitting, by unicast via the wireless communication, a command for instructing to end the prescribed operation to each image capturing apparatus, in response to detection of an operation for instructing to end the prescribed operation; and
- a retransmission step of confirming a response from each image capturing apparatus to transmission of the command for instructing to end the prescribed operation, and retransmitting, by unicast, a command for instructing to end the prescribed operation to each image capturing apparatus whose response is not confirmed.

8. A command transmission method to be performed by a control apparatus configured to be connected to at least one image capturing apparatus by wireless communication, for transmitting a command to the at least one image capturing apparatus, the command transmission method comprising:
- a transmission step of transmitting, by multicast or broadcast via the wireless communication, a command for instructing to start a prescribed operation to each image capturing apparatus that is connected to the control apparatus, in response to detection of an operation for instructing to start the prescribed operation, and transmitting, by multicast or broadcast via the wireless communication, a command for instructing to end the prescribed operation to each image capturing apparatus, in response to detection of an operation for instructing to end the prescribed operation; and
- a response step of transmitting, in response to an inquiry about a status of the operation related to the prescribed operation that has been started in each image capturing apparatus in response to reception of the command for instructing to start the prescribed operation, information that indicates the status of the operation to each image capturing apparatus from which the inquiry originated.

9. A non-transitory computer-readable storage medium storing a program for causing a computer to execute the steps of the command transmission method according to claim 7.

10. A non-transitory computer-readable storage medium storing a program for causing a computer to execute the steps of the command transmission method according to claim 8.

11. The control apparatus according to claim 2, further comprising an image capturing unit,
- wherein the prescribed operation is an operation related to image capturing performed by the image capturing unit, and
- the image capturing unit controls execution of the prescribed operation in response to the detection unit detecting the operation for instructing to start the prescribed operation and the operation for instructing to end the prescribed operation.

12. The control apparatus according to claim 11,
- wherein the command for instructing to start the prescribed operation is a command to start continuous shooting that is performed by the image capturing unit, and the command for instructing to end the prescribed operation is a command to stop the continuous shooting that is performed by the image capturing unit.

13. The control apparatus according to claim 3, wherein the prescribed operation is shooting preparation of the image capturing unit.

14. The control apparatus according claim 13, wherein an operation input designating the shooting preparation is detected in response to a user's operation to a first switch included in a release switch.

15. The control apparatus according to claim 3, wherein the prescribed operation is a shooting preparation of the image capturing unit.

16. The control apparatus according to claim 15, wherein an operation input designating the shooting operation is detected in response to a user's operation to a second switch included in a release switch.

17. The control apparatus according to claim 11, wherein the prescribed operation is shooting preparation of the image capturing unit.

18. The control apparatus according to claim 17, wherein an operation input designating the shooting preparation is detected in response to a user's operation to a first switch included in a release switch.

19. The control apparatus according to claim 11, wherein the prescribed operation is a shooting preparation of the image capturing unit.

20. The control apparatus according to claim 19, wherein an operation input designating the shooting operation is detected in response to the user's operation to a second switch included in a release switch.

* * * * *